United States Patent [19]

Falcetta et al.

[11] Patent Number: 4,645,811

[45] Date of Patent: Feb. 24, 1987

[54] MATERIAL USED FOR OPTICAL DEVICES

[75] Inventors: Joseph J. Falcetta, Arlington, Tex.; Wilhelm F. Kunzler, Fairport, N.Y.

[73] Assignee: Oculus Contact Lens Company, Chicago, Ill.

[21] Appl. No.: 595,580

[22] Filed: Apr. 2, 1984

[51] Int. Cl.$^4$ .............................. C08F 30/08
[52] U.S. Cl. ..................... 526/279; 523/107
[58] Field of Search ............................ 526/279

[56] References Cited

U.S. PATENT DOCUMENTS

| | | | |
|---|---|---|---|
| RE. 31,406 | 10/1983 | Gaylord | 526/279 |
| 3,803,093 | 4/1974 | Neefe | 260/66 |
| 3,808,178 | 4/1974 | Gaylord | 260/86.1 E |
| 3,808,179 | 4/1974 | Gaylord | 260/86.1 E |
| 3,965,063 | 6/1976 | Holcombe | 260/29.6 TA |
| 3,984,485 | 10/1976 | Neefe | 260/63 DY |
| 4,120,570 | 10/1978 | Gaylord | 526/279 |
| 4,139,548 | 2/1979 | Tanaka et al. | 260/448.2 B |
| 4,139,692 | 2/1979 | Tanaka et al. | 526/218 |
| 4,152,508 | 5/1979 | Ellis et al. | 526/279 |
| 4,163,608 | 8/1979 | Neefe | 351/160 H |
| 4,168,112 | 9/1979 | Ellis et al. | 351/160 H |
| 4,198,131 | 4/1980 | Birdsell et al. | 351/160 R |
| 4,216,303 | 8/1980 | Novicky | 52 B/32 |
| 4,235,985 | 11/1980 | Tanaka et al. | 526/279 |
| 4,242,483 | 12/1980 | Novicky | 526/263 |
| 4,248,989 | 2/1981 | Novicky | 526/264 |
| 4,284,749 | 8/1981 | Neefe | 526/304 |
| 4,306,042 | 12/1981 | Neefe | 526/75 |
| 4,410,674 | 10/1983 | Ivani | 526/279 |

Primary Examiner—Paul R. Michl
Attorney, Agent, or Firm—Harry C. Post, III

[57] ABSTRACT

A material adapted to be used as a contact lens is made from a solid copolymer. The copolymer is made from an alkyl acrylate ester, an organosiloxane ester and a proteinaceous inhibiting wetting mixture of N-(1,1-dimethyl-3-oxobutyl)acrylamide and one or more acids selected from the group consisting of acrylic and methacrylic acid.

26 Claims, No Drawings

MATERIAL USED FOR OPTICAL DEVICES

It is well known that certain individuals have visual aberrations which are corrected by optical devices, such as a contact lens. These optical devices are worn between the individual's eye and eye lid, and are subjected to the proteinaceous materials, such as lysozyme, carried within the fluids of the eye. These proteinaceous materials fight bacteria within the eye and are therefore necessary to prevent infection of the individual's eye.

Further, it is well known that certain individuals have a great deal of difficulty adjusting to the wearing of these optical devices because of the foreign object sensation caused by these optical devices. To assist in eliminating this foreign object sensation, numerous polymeric materials have been suggested to allow an increased amount of oxygen to be received by the eye and to increase the amount of liquid either within or on the surface of the optical device. Some examples of these polymeric materials are given in U.S. Pat. No. 3,803,093 to Neefe; U.S. Pat. No. 3,808,178 to Gaylord; U.S. Pat. No. 3,965,063 to Holcombe; U.S. Pat. No. 3,984,485 to Neefe, U.S. Pat. No. 4,139,548 to Tanaka et al; U.S. Pat. No. 4,139,692 to Tanaka et al; U.S. Pat. No. 4,152,508 to Ellis et al; U.S. Pat. No. 4,163,608 to Neefe; U.S. Pat. No. 4,168,112 to Ellis et al; U.S. Pat. No. 4,198,131 to Birdsall et al; U.S. Pat. No. 4,216,303 to Novicky; U.S. Pat. No. 4,235,985 to Tanaka et al; U.S. Pat. No. 4,242,483 to Novicky; U.S. Pat. No. 4,284,749 to Neefe; and U.S. Pat. No. 4,306,042 to Neefe. In these patents, the polymeric materials commonly include a solid copolymer of an ester of acrylic or methacrylic acid, an ester of an organosiloxane and a hydrophilic wetting ester, such as acrylic or methacrylic acid or hydroxyethyl methacrylate. Although these polymeric materials assist in eliminating the foreign object sensation in the wearer's eye, the proteinaceous material carried in the wearer's eye liquids will bind with the polymeric material. Thus, the contact lens will eventually become coated with such proteinaceous material and the wearer will be required to remove the lens for cleaning or maybe even polishing, which effects the length of time the optical device may be worn by the individual and the ultimate life of the optical device.

Accordingly, it is an object of the present invention to provide a material adapted for use as an optical device, specifically a contact lens, made from a solid copolymer which inhibits the binding of proteinaceous material to the copolymer while providing a copolymer having good gas permeability, wettability and optical stability.

Further, it is an object of the present invention to provide a material made from a solid copolymer formed from an alkyl acrylate monomer or ester, an organosiloxane monomer or ester and a proteinaceous inhibiting wetting mixture of N-(1,1-dimethyl-3-oxobutyl)acrylamide and an acrylic or methacrylic acid.

The novel material of the present invention is a solid copolymer made from one or more esters or monomers of from about 40 to about 90 part by weight of an alkyl acrylate ester or monomer, of from about 10 to about 60 parts by weight of an organosiloxane ester or monomer, and of from about 6.5 to about 19.5 parts by weight of a proteinaceous inhibiting wetting mixture. Preferably, the copolymer has from about 50 to about 62 parts by weight alkyl acrylate monomer and from about 24 to about 30 parts by weight organosiloxane monomer. It is also preferred that the copolymer uses from about 11.5 to about 15.5 parts by weight proteinaceous inhibiting wetting mixture. Further, it is preferred that the mixture consists essentially of N-(1,1-dimethyl-3-oxobutyl)acrylamide and one or more acids selected from the group consisting of acrylic and methacrylic acids in a ratio of N-(1,1-dimethyl-3-oxobutyl)acrylamide to acid of from about 1.5:1.0 to about 5.0:1.0.

The alkyl acrylate monomer or ester used in the present invention has the following structure.

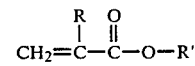

wherein R is selected from the group consisting of hydrogen and methyl and R' is selected from the group of alkyls with 1 to 10 carbon atoms. The preferred alkyl acrylate monomer used in the novel copolymer is methyl methacrylate.

The organosiloxane monomer used in the present invention has the following structure.

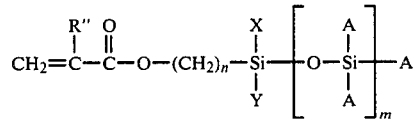

wherein X and Y are selected from the group consisting of an alkyl of 1 to 5 carbon atoms, a phenyl and a Z group, the Z group having the structure

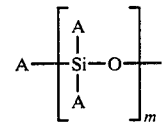

with A being selected from the group consisting of an alkyl of 1 to 5 carbon atoms and phenyl, R" is selected from the group consisting of hydrogen and methyl, m is an integer of from 1 to 5 and n is integer of from 1 to 3. The preferred organosiloxane monomer or ester used in the novel copolymer is methacryloyloxypropyl tris(trimethylsilyl)siloxane.

The proteinaceous inhibiting wetting mixture used in the novel copolymer consists essentially of about 5.0 to about 10.0 parts by weight N-(1,1-dimethyl-3-oxobutyl)acrylamide and of from about 1.5 to about 9.5 parts by weight of acrylic or methacrylic acid. A preferred proteinaceous inhibiting wetting mixture used in the novel copolymer consists essentially of from about 9.0 to about 10.0. N-(1,1-dimethyl-3-oxobutyl)acrylamide and of from about 2.5 to about 5.5 methacrylic acid.

If desired cross-linking agents may be used in the novel copolymer in amounts of from about 0.01 to about 2.00 parts by weight to increase the rigidity of the novel copolymer. Some examples of cross-linking agents that may be used are polyfunctional derivatives of acrylic acid, methacrylic acid, acrylamide, methacrylamide and multi-vinyl substituted benzenes, including but not limited to the following; ethylene glycol diacrylate or dimethacrylate, diethylene glycol diacrylate or dimethacrylate, tetraethylene glycol diacrylate or dimethacrylate, polyethylene glycol diacrylate or dimethacrylate, trimethylolpropane triacrylate or trimethacrylate, Bisphenol A diacrylate or dimethacrylate, ethoxylated Bisphenol A diacrylate or dimethacrylate, pentaerythritol tri-and tetraacrylate or methacrylate, tetramethylenediacrylate or dimethacrylate, methylene bisacrylamide or methacrylamide, dimethylenebisacrylamide or methacrylamide, N,N'-dihydroxyethylene bisacrylamide or methacrylamide, hexamethylene bisacrylamide or methacrylamide decamethylene bisacrylamide or methacrylamide, and divinyl benzene.

The novel material is made into a solid copolymer by conventional free radical polymerization techniques. These techniques may employ from about 0.05 to about 2.00 parts by weight of a free radical initiator. Some representative free radical initiators that may be used with the cited monomers include: acetyl peroxide, lauroyl peroxide, decanoyl peroxide, caprylyl peroxide, benzoyl peroxide, tertiarybutyl peroxypivalate, diisopropyl peroxycarbonate, tertiarybutyl peroctoate, 2,2'-azobis(2methylpropionitrile) and benzoin methyl ether. Preferrably, from about 0.1 to about 0.3 parts by weight of 2,2'-azobis(2methylpropionitrile) is used as the free radical initiator to make the novel copolymer.

The following examples are presented to illustrate the practice of the invention and not as an indication of the limits or scope thereof.

EXAMPLE 1

The novel copolymer was made by dissolving 9.6 parts by weight of N-(1,1-dimethyl-3-oxobutyl)acrylamide in 57.8 parts by weight of methyl methacrylate. Added to this mixture were 28.4 parts by weight methacryloyloxypropyl tris(trimethylsilyl)siloxane, 2.0 parts by weight acrylic acid, 2.0 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95 C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

EXAMPLE 2

The novel copolymer was made by dissolving 9.5 parts by weight of N-(1,1-dimethyl-3-oxobutyl)acrylamide in 57.3 parts by weight of methyl methacrylate. Added to this mixture was 28.2 parts by weight methacryloyloxypropyl tris(trimethylsilyl)siloxane, 2.9 parts by weight acrylic acid, 1.9 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

EXAMPLE 3

The novel copolymer was made by dissolving 9.3 parts by weight of N-(1,1-dimethyl-3-oxobutyl)acrylamide in 56.2 parts by weight of methyl methacrylate. Added to this mixture were 27.6 parts by weight methacryloyloxypropyl tris(trimethylsilyl)siloxane, 4.8 parts by weight acrylic acid, 1.9 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95 C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

EXAMPLE 4

The novel copolymer was made by dissolving 9.4 parts by weight of N-(1,1-dimethyl-3-oxobutyl)acrylamide in 57.3 parts by weight of methyl methacrylate. Added to this mixtured were 28.2 parts by weight methacryloyloxypropyl tris(trimethylsilyl)siloxane, 2.9 parts by weight methacrylic acid, 1.9 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95 C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

EXAMPLE 5

The novel copolymer was made by dissolving 9.3 parts by weight of N-(1,1-dimethyl-3-oxobutyl)acrylamide in 56.2 parts by weight of methyl methacrylate. Added to this mixture were 27.6 parts by weight methacryloyloxypropyl tris(trimethylsilyl)siloxane, 4.8 parts by weight methacrylic acid, 1.9 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95 C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

EXAMPLE 6

The novel copolymer was made by dissolving 9.8 parts by weight of N-(1,1-dimethyl-3-oxobutyl)acrylamide in 56.0 parts by weight of methyl methacrylate. Added to this mixture were 27.0 parts by weight methacryloyloxypropyl tris(trimethylsilyl)siloxane, 5.0 parts by weight methacrylic acid, 2.0 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95 C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

EXAMPLE 7

The novel copolymer was made by dissolving 5.7 parts by weight of N-(1,1-dimethyl-3-oxobutyl)acrylamide in 55.6 parts by weight of methyl methacrylate. Added to this mixture were 27.4 parts by weight methacryloyloxypropyl tris(trimethylsilyl)siloxane, 9.2 parts by weight methacrylic acid, 1.9 parts by weight ethylene glycol dimethacrylate and 0.2 parts by weight 2,2'-Azobis(2methylpropionitrile), this mixture was then stirred vigorously for one hour under a vacuum, allowed to stand for one hour, filtered and then stirred for 30 minutes. The mixture was disposed within a container, which had been washed, rinsed in a 5% solution of dimethyl-dichlorosilane and distilled water and dried in an oven. The container was caped and placed in a water bath at 35 C. for 5 days. The solidified copolymer was then cured for 4 days according to the following cycle: first day 55 C.; second day 75 C.; third day 95 C.; and fourth day 95 C. The copolymer was then cooled with a drop of 20 C. every 4 hours until room temperature was obtained. The material was then machine lathed to a disk size of approximately 12.5 mm×6 mm and the disks disposed within a nitrogen filled container for a final 4 day cure rate according to the following cycle: first day 55 C.; second day 75 C.; third day 95 C.; and fourth day 95 C. A cooling cycle of 20 C. per 4 hour interval was used on the disks to reach room temperature.

The physical properties of the copolymers given in the examples are optically homogeneous, i.e., no optical gradient, are oxygen permeable of at least $DK = 12 \times 10^{-11}$ ml $O_2$ cm$^2$/sec ml mg Hg, are dimensionally stable within about 0.2% according to standard ANSI/ASTM D 756-78, have an index of refraction of about nD 1.5 according to standard ANSI/ASTM D542-20, have a light transmission of 98% according to standard ANSI Z80.6; .4.5, have a hardnes of about D/96 according to standard ANSI/ ASTM D2240-75, are non-toxic according to F.D.A. clinical guidelines (CFR-21), have a wetting angle of about 20° according to standard CLMA/STD. PROCEDURE, and have a proteinaceous material binding rate of about 0.8% according to a radioactively labeled protein hormone at 7.2 pH. The test used to determine the binding rate involved placing a lens in a 16×100 mm borosilicate glass test tube, disposing 50 milliliters of radioactively labeled insulin which was prepared in 0.01 M sodium phosphate buffer to an activity of 1.0 Ci/ml, incubating the materials in the test tubes at 37 C. for 30 minutes, stopping the reaction by placing the test tubes in an ice bath, removing the lens from the test tubes, placing the lens on a steel filter block, washing the lens three times under a vacuum with 15.0 milliliters of a 0.01 M sodium phosphate buffer, placing the lens into a 7 ml disposable borosilicate glass scintillation vial, adding 3 ml of scintillation fluor, and determining the radioactivity using a Packard Prias liquid scintillation counter with the results being converted to nanograms of radioactivity per lens.

While specific examples of the invention have been described, many variations are possible within the scope of keeping the physical properties described. Such variations include the use of mixtures of esters within the components to make up the required percentage of each. For example, two or more organosiloxane esters can be used instead of a single such ester for that component of the system. Similarly, two or more cross-linking agents may be used if desired. Conventional additives used in contact lenses, such as colorants, tints and the like, may also be employed within the normal ranges of the materials.

The invention having been described, what is claimed is:

1. A solid proteinaceous inhibiting copolymer formed by reacting together: of from about 40 to about 90 parts by weight of one or more alkyl acrylate esters of the structure

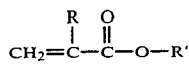

wherein R is methyl or hydrogen and R' is an alkyl of 1 to 10 carbon atoms; of from about 10 to about 60 parts by weight of one or more organosiloxane esters of the structure

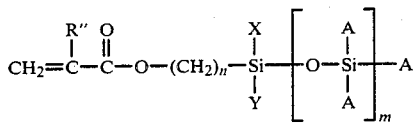

wherein X and Y are selected from the group consisting of an alkyl of 1 to 5 carbon atoms, a phenyl and a Z group, the Z group being of the structure

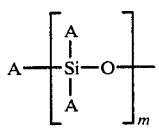

wherein A is selected from the group consisting of an alkyl of 1 to 5 carbon atoms and phenyl, R" is selected from the group consisting of methyl and hydrogen, m is an integer from 1 to 5 and n is an integer from 1 to 3; and a mixture consisting essentially of from about 5.0 to about 10.0 parts by weight N-(1,1-dimethyl-3-oxobutyl)acrylamide; and of from about 1.5 to about 9.5 parts by weight of one or more acids selected from the group consisting of methacrylic and acrylic acid.

2. A copolymer as set forth in claim 1, including the parts by weight of the alkyl acrylate ester being from about 50.0 to about 62.0 and the parts by weight of the organosiloxane ester being from about 24.0 to about 30.0.

3. A copolymer as set forth in claim 2, including said alkyl acrylate ester being methyl methacrylate and said organosiloxane ester being methacryloyloxypropyl tris(trimethylsilyl)siloxane.

4. A copolymer as set forth in claim 3, including the parts by weight of methyl methacrylate to the parts by weight of methacryloyloxypropyl tris(trimethylsilyl)siloxane being in the ratio of about 2.0:1.0.

5. A copolymer as set forth in claim 4, including the parts by weight of methacryloyloxypropyl tris(trimethylsilyl)siloxane to the parts by weight of N-(1,1-dimethyl-3-oxobutyl)acrylamide having a ratio of from about 14.0:1.0 to about 2.5:1.0.

6. A copolymer as set forth in claim 1, including the parts by weight of alkyl acrylate ester to the parts by weight of organosiloxane ester being in a ratio of about 2.0:1.0.

7. A copolymer as set forth in claim 1, including the parts by weight of N-(1,1-dimethyl-3-oxobutyl)acrylamide to the parts by weight of the acid being in a ratio of from about 0.5:1.0 to about 5.0:1.0.

8. A copolymer as set forth in claim 1, including the parts by weight of the organosiloxane ester to the parts by weight of N-(1,1-dimethyl-3-oxobutyl)acrylamide having a ratio of from about 14.0:1.0 to about 2.5:1.0.

9. A copolymer as set forth in claim 1, including said mixture consisting essentially of from about 9.0 to about 10.0 parts by weight of N-(1,1-dimethyl-3-oxobutyl)acrylamide and from about 2.5 to about 5.5 parts by weight of methacrylic acid.

10. In a material adapted to be used as an optical device of the class wherein the material is a solid copolymer made of one or more esters of from about 40 to about 90 parts by weight of an alkyl acrylate ester of the structure

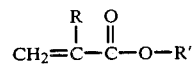

wherein R is methyl or hydrogen and R' is an alkyl of 1 to 10 carbon atoms; of from about 10 to about 60 parts by weight of an organosiloxane ester of the structure

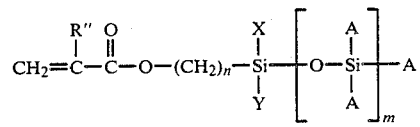

wherein X and Y are selected from the group consisting of an alkyl of 1 to 5 carbon atoms, a phenyl and a Z group, the Z group being of the structure

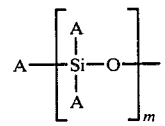

wherein A is selected from the group consisting of an alkyl of 1 to 5 carbon atoms and phenyl, R" is selected from the group consisting of methyl and hydrogen, m is an integer from 1 to 5 and n is an integer from 1 to 3; of from about 5.0 to about 10.0 parts by weight N-(1,1-dimethyl-3-oxobutyl)acrylamide; and of from about 1.5 to about 9.5 parts by weight of one or more acids selected from the group consisting of methacrylic and acrylic acid.

11. A material as set forth in claim 10, including the parts by weight of the alkyl acrylate ester being from about 50.0 to about 62.0 and the parts by weight of the organosiloxane ester being from about 24.0 to about 30.0.

12. A material as set forth in claim 11, including said alkyl acrylate ester being methyl methacrylate and said organosiloxane ester being methacryloyloxypropyl tris(trimethylsilyl)siloxane.

13. A material as set forth in claim 12, including the parts by weight of methyl methacrylate to the parts by weight of methacryloyloxypropyl tris(trimethylsilyl)siloxane being in the ratio of about 2.0:1.0.

14. A material as set forth in claim 13, including the parts by weight of methacryloyloxypropyl tris(trimethylsilyl)siloxane to the parts by weight of N-(1,1-dimethyl-3-oxobutyl)acrylamide having a ratio of from about 14.0:1.0 to about 2.5:1.0.

15. A material as set forth in claim 10, including the parts by weight of alkyl acrylate ester to the parts by weight of organosiloxane ester being in a ratio of about 2.0:1.0.

16. A material as set forth in claim 10, including the parts by weight of N-(1,1-dimethyl-3-oxobutyl)acrylamide to the parts by weight of the acid being in a ratio of from about 0.5:1.0 to about 5.0:1.0.

17. A material as set forth in claim 10, including the parts by weight of the organosiloxane ester to the parts by weight of N-(1,1-dimethyl-3-oxobutyl)acrylamide having a ratio of from about 14.0:1.0 to about 2.5:1.0.

18. A material as set forth in claim 10, including of from about 9.0 to about 10.0 parts by weight of N-(1,1-dimethyl-3-oxobutyl)acrylamide and of from about 2.5 to about 5.5 parts by weight of methacrylic acid.

19. A solid copolymer made of one or more esters: of from about 40 to 90 parts by weight of an alkyl acrylate ester of the structure

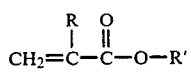

wherein R is methyl or hydrogen and R' is an alkyl of 1 to 10 carbon atoms; of from about 10 to about 60 parts by weight of an organosiloxane ester of the structure

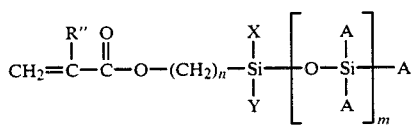

wherein X and Y are selected from the group consisting of an alkyl of 1 to 5 carbon atoms, a phenyl and a Z group, the Z group being of the structure

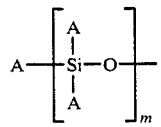

wherein A is selected from the group consisting of an alkyl of 1 to 5 carbon atoms and phenyl, R'' is selected from the group consisting of methyl and hydrogen, m is an integer from 1 to 5 and n is an integer from 1 to 3; and of from about 6.5 to about 19.5 parts by weight of N-(1,1-dimethyl-3-oxobutyl)acrylamide and one or more acids consisting of acrylic or methacrylic acid, the parts by weight of N-(1,1-dimethyl-3-oxobutyl)acrylamide to the parts by weight of the acid being in a ratio of from about 0.5:1.0 to about 5.0:1.0.

20. A copolymer as set forth in claim 19, including said of from about 6.5 to about 19.5 parts by weight of N-(1,1-dimethyl-3-oxobutyl)acrylamide and one or more acids consisting of acrylic or methacrylic acid being of from about 11.5 to about 15.5 parts by weight of the copolymer.

21. A copolymer as set forth in claim 19, including the parts by weight of the alkyl acrylate ester being from about 50.0 to about 62.0 and the parts by weight of the organosiloxane ester being from about 24.0 to about 30.0.

22. A copolymer as set forth in claim 19, including said alkyl acrylate ester being methyl methacrylate and said organosiloxane ester being methacryloyloxypropyl tris(trimethylsilyl)siloxane.

23. A copolymer as set forth in claim 22, including the parts by weight of methyl methacrylate to the parts by weight of methacryloyloxypropyl tris(trimethylsilyl)siloxane being in the ratio of about 2.0:1.0.

24. A copolymer as set forth in claim 23, including the parts by weight of methacryloyloxypropyl tris(trimethylsilyl)siloxane to the parts by weight of N-(1,1-dimethyl-3-oxobutyl)acrylamide having a ratio of from about 14.0:1.0 to about 2.5:1.0.

25. A copolymer as set forth in claim 19, including the parts by weight of the organosiloxane ester to the parts by weight of N-(1,1-dimethyl-3-oxobutyl)acrylamide having a ratio of from about 14.0:1.0 to about 2.5:1.0.

26. A copolymer as set forth in claim 19, including said of from about 6.5 to about 19.5 parts by weight of N-(1,1-dimethyl-3-oxobutyl)acrylamide and one or more acids consisting of acrylic or methacrylic acid consisting essentially of from about 9.0 to about 10.0 parts by weight of N-(1,1-dimethyl-3-oxobutyl)acrylamide and from about 2.5 to about 5.5 parts by weight of methacrylic acid.

* * * * *